US012792507B2

(12) United States Patent
Barczak et al.

(10) Patent No.: US 12,792,507 B2
(45) Date of Patent: Nov. 10, 2026

(54) DATA ACCESS MANAGEMENT IN COMPUTATIONAL STORAGE DEVICES

(71) Applicant: SK Hynix NAND Product Solutions Corp., Rancho Cordova, CA (US)

(72) Inventors: Mariusz Barczak, Gdansk (PL); Łukasz Porycki, Nowy Dwor Gdanski (PL); Samuel Bradshaw, Sacramento, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 19/000,107

(22) Filed: Dec. 23, 2024

(65) Prior Publication Data

US 2026/0178479 A1 Jun. 25, 2026

(51) Int. Cl.

| | |
|---|---|
| ***G06F 12/02*** | (2006.01) |
| ***G06F 3/06*** | (2006.01) |
| ***G06F 12/06*** | (2006.01) |

(52) U.S. Cl.

CPC ........ *G06F 12/0246* (2013.01); *G06F 3/0604* (2013.01); *G06F 3/0638* (2013.01); *G06F 3/0688* (2013.01); *G06F 12/06* (2013.01)

(58) Field of Classification Search

CPC ............... G06F 12/0246; G06F 3/0638; G06F 3/0688; G06F 12/06

See application file for complete search history.

(56) References Cited

U.S. PATENT DOCUMENTS

| | | | | |
|---|---|---|---|---|
| 4,733,923 | A * | 3/1988 | Dahnert | A47B 53/02 361/189 |
| 11,645,011 | B2 | 5/2023 | Lee et al. | |
| 2007/0028141 | A1 * | 2/2007 | Lavastre | G06F 12/0246 714/23 |
| 2009/0119663 | A1 * | 5/2009 | Mukherjee | G06F 12/1081 718/1 |

(Continued)

OTHER PUBLICATIONS

Mishra, Mayank, and Arun K. Somani. "On-Disk Data Processing: Issues and Future Directions." arXiv:1709.02718, arXiv, Sep. 8, 2017. arXiv.org, https://doi.org/10.48550/arXiv.1709.02718. (Year: 2017).*

(Continued)

*Primary Examiner* — Reginald G Bragdon
*Assistant Examiner* — Zakaria Mohammed Belkhayat
(74) *Attorney, Agent, or Firm* — Morgan, Lewis & Bockius LLP

(57) ABSTRACT

This application is directed to data processing and management in a memory device. The memory device reserves a register in the buffer for storing memory access information associated with the data processor. The memory device obtains a notification of a data write request issued by the data processor. In response to the notification, the memory controller extracts, from the register, a write request location where the data write request is stored, the data write request including at least payload data to be stored in the non-volatile memory. Further in response to the notification, the memory controller, based on the write location, extracts, from a first request queue stored in the buffer, the data write request including the payload data. Further in response to the notification, the memory controller writes the payload data to the non-volatile memory.

20 Claims, 10 Drawing Sheets

(56) References Cited

U.S. PATENT DOCUMENTS

| | | | | |
|---|---|---|---|---|
| 2009/0119684 | A1* | 5/2009 | Mahalingam ....... | G06F 9/45558 719/324 |
| 2011/0185114 | A1* | 7/2011 | Bolanowski .......... | G06F 3/0659 711/E12.001 |
| 2017/0160933 | A1* | 6/2017 | De Jong ............... | G06F 3/0619 |
| 2020/0081836 | A1* | 3/2020 | Kaushikkar ......... | G06F 12/0831 |
| 2021/0149599 | A1* | 5/2021 | Kajihara ............... | G06F 3/0656 |
| 2022/0083271 | A1 | 3/2022 | Cho | |
| 2022/0391224 | A1 | 12/2022 | Pinto | |
| 2023/0065300 | A1* | 3/2023 | Labat .................... | G06F 3/0659 |
| 2023/0185598 | A1 | 6/2023 | Kim et al. | |
| 2023/0229313 | A1* | 7/2023 | Terada .................. | G06F 3/0611 711/105 |
| 2023/0418518 | A1* | 12/2023 | Hahn ...................... | G06F 3/061 |
| 2024/0086102 | A1 | 3/2024 | Kachare et al. | |
| 2024/0273013 | A1* | 8/2024 | Yi ....................... | G06F 12/0246 |

OTHER PUBLICATIONS

"VirtIO on Linux", Linux kernel documentation, Snapshot from Wayback Machine, Sep. 19, 2024 (Year: 2024).*

SK Hynix NAND Product Solutions Corp. (dba Solidigm), PCT/US2025/061150, International Search Report and Written Opinion, May 12, 2026, 13 pgs.

* cited by examiner

DATA ACCESS MANAGEMENT IN COMPUTATIONAL STORAGE DEVICES

TECHNICAL FIELD

This application relates generally to communicating data in an electronic system including, but not limited to, methods, systems, and non-transitory computer-readable media for managing and processing data in a memory device acting as a computational storage device.

BACKGROUND

Memory is applied in a computing system to store instructions and data. The data are processed by one or more processors of the computing system according to the instructions stored in the memory. Multiple memory units are used in different portions of the computing system to serve distinct functions. Specifically, the computing system includes non-volatile memory that acts as secondary memory to keep data stored thereon if the computing system is decoupled from a power source. Examples of the secondary memory include, but are not limited to, hard disk drives (HDDs) and solid-state drives (SSDs). The secondary memory relies on a memory controller to manage its memory space and process read, write, and read-modify-write requests from a host device efficiently with low latency. Additionally, the secondary memory has been enhanced to incorporate local in-memory data processing capabilities. However, the computing system struggles with efficiently accessing the data stored in the non-volatile memory to facilitate execution of in-memory processing tasks without disrupting handling of memory access requests from the host device.

SUMMARY

Various embodiments of this application are directed to methods, systems, devices, non-transitory computer-readable media for managing data in a memory device acting as a computational storage device to facilitate computational storage functions (e.g., including in-memory data processing operations) within the memory device. In some embodiments, the memory device is transformed to a computational storage device (CSD) by incorporating a data processor. The data processor is configured to process internal computational storage operations (e.g., data processing operations) locally on the memory device, while the memory controller of the memory device specializes in performing generic storage functions including memory access functions (e.g., input/output (I/O) access operations) and internal memory management functions. In some embodiments, the data processor implements the computational storage operations on data extracted from a non-volatile memory and stores data into the non-volatile memory. The memory device reserves a buffer to facilitate the data processor to access the non-volatile memory via the memory controller. Particularly, the memory device includes an interrupt handler loaded on a firmware level to manage both in-memory data access requests of the data processor and host-based memory access requests associated with the generic storage function of the memory device.

In one aspect, a method is implemented to access data at a memory device having a memory controller, a data processor, a non-volatile memory, and a buffer. The method includes reserving a register in the buffer for storing memory access information associated with the data processor and obtaining a notification of a data write request issued by the data processor. The method further includes, in response to the notification, at the memory controller, extracting, from the register, a write request location where the data write request is stored, the data write request including at least payload data to be stored in the non-volatile memory; and extracting, based on the write request location, from a request queue stored in the buffer, the data write request including the payload data. The method further includes writing the payload data to the non-volatile memory or providing the payload data to a host device coupled to the memory device.

In another aspect, a method is implemented to manage data at a memory device having a memory controller, a data processor, a non-volatile memory, and a buffer. The method includes reserving a register in the buffer for storing memory access information associated with the data processor and obtaining a notification of a data read request issued by the data processor. The method further includes, in response to the notification, at the memory controller, extracting, from the reserved register in the buffer, a read request location where the data read request is stored, the data read request including a logical address of target data; based on the read request location, extracting, from a request queue stored in the buffer, the data read request including the logical address; extracting the target data from the non-volatile memory based on the logical address; and providing the target data to the data processor by way of the buffer.

In another aspect, some implementations include an electronic device that includes a memory controller, a data processor, a non-volatile memory, and a buffer. The electronic device further includes memory having instructions stored thereon for performing any of the above methods of managing data in the electronic device. In some embodiments, the electronic device is a memory system (e.g., SSDs) or a memory device (e.g., an SSD).

In yet another aspect, some implementations include a non-transitory computer readable storage medium storing one or more programs. The one or more programs include instructions, which when executed by an electronic device cause the electronic device to implement any of the above methods of managing data in the electronic device.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with storage capabilities.

Various embodiments of this application are directed to methods, systems, devices, non-transitory computer-readable media for facilitating fast communication between a host device and a computation storage device running on an SSD by reserving registers of a buffer for accessing data from a corresponding directory location of a guest OS running on the computation storage device. In accordance with some embodiments, this minimizes additional costs and/or barriers to entry for users of the guest OS by allowing the users to rely on standardized communication protocols and avoiding having to modify the guest OS in order to use customized software and/or drivers of the host device. In some implementations, the SSD firmware of the computation storage device include a VirtIO network device implementation which can be configured to enumerate through memory-mapped I/O transport to a VirtIO driver of the guest OS.

Figure 1:
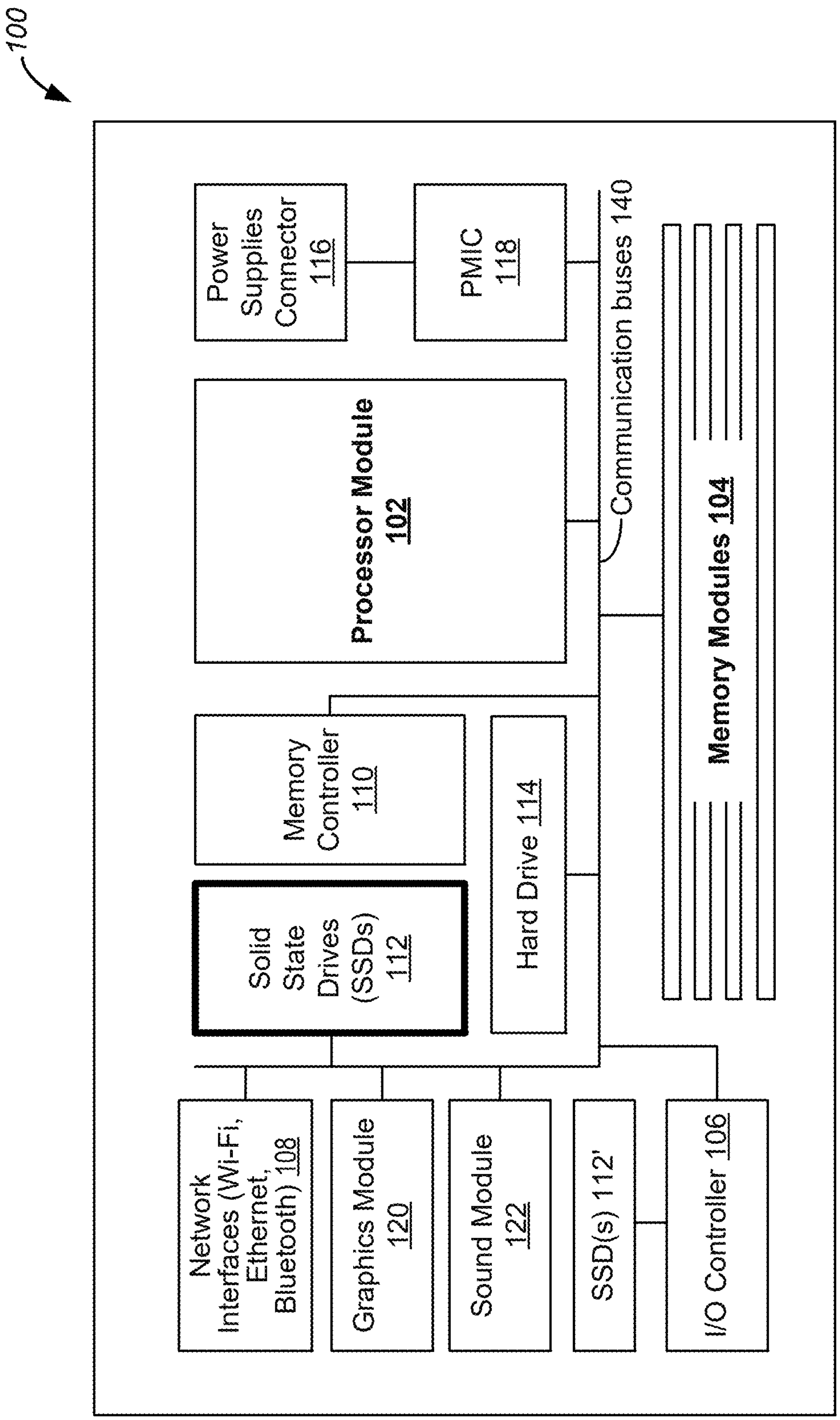
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse, or a trackpad) via a universal serial bus interface. In some embodiments, the network interfaces 108 includes one or more interfaces for Wi-Fi, Ethernet, and Bluetooth networks, each allowing the electronic system to exchange data with an external source, e.g., a server or another electronic system. In some embodiments, the one or more communication buses 140 include circuitry (sometimes called a chipset) that interconnects and controls communications among various system components included in system module 100.

In some embodiments, the memory modules 104 include high-speed random-access memory (RAM), such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively, or additionally, in some embodiments, the system module 100 further includes SSD(s) 112' coupled to the I/O controller 106 directly. Conversely, the SSD(s) 112 are coupled to the one or more communication buses 140. In an example, the one or more communication buses 140 operates in compliance with PCIe, which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
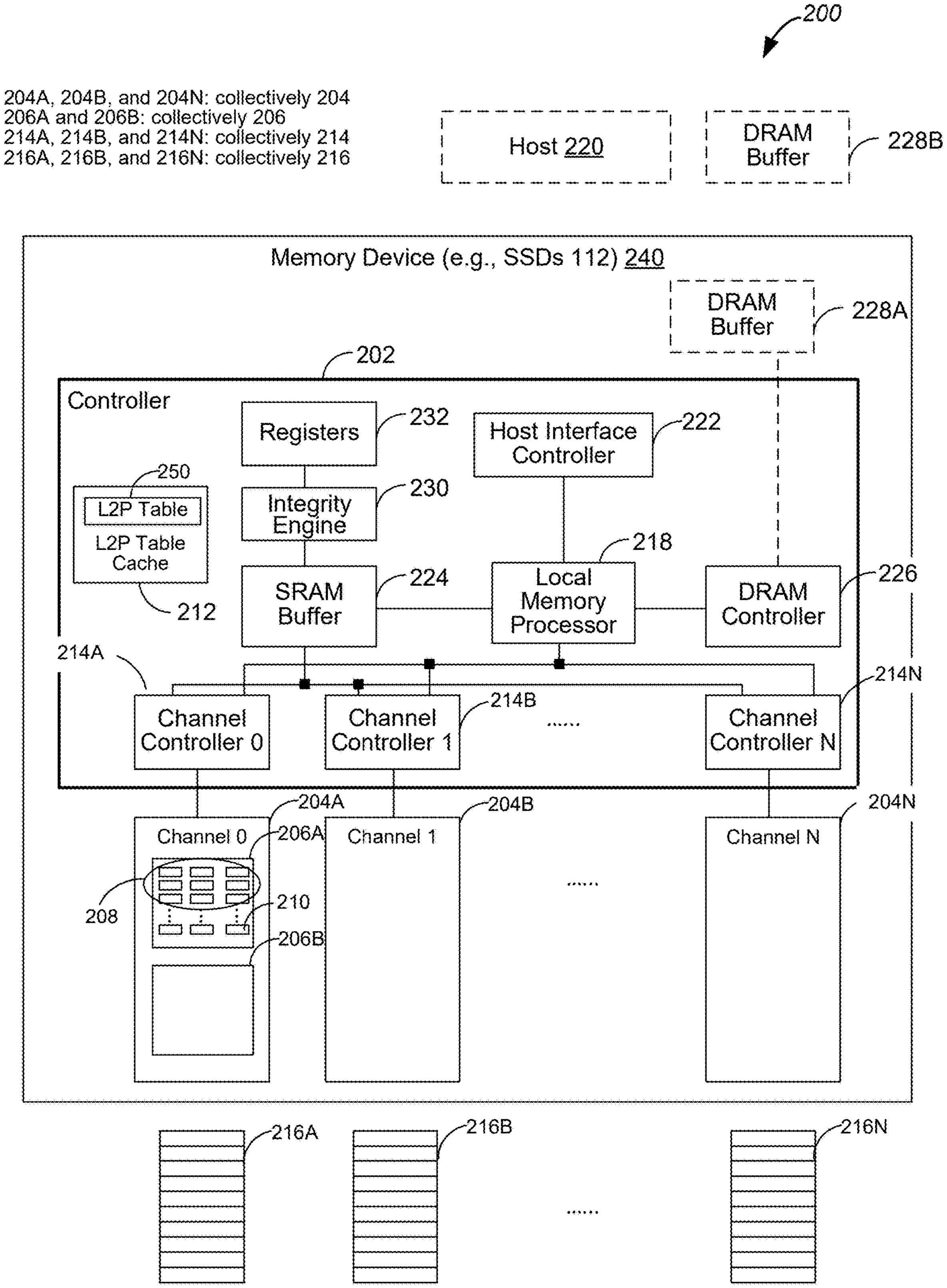
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system (OS) and execute user applications. The memory system 200 includes one or more memory devices 240 (e.g., SSD(s)). Each memory device 240 further includes a memory controller 202 and a plurality of memory channels 204 (e.g., channel 204A, 204B, and 204N). Each memory channel 204 includes a plurality of memory cells. The memory controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks is configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the host driver of the host device 220 manages the cache, which may thereby be referred to as a host-managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits (e.g., X data bits, where X is greater than 5). In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective memory channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller 202 to implement internal memory management functions including, but are not limited to, garbage collection, wear levelling, read disturb mitigation, memory snapshot capturing, memory mirroring, caching, and memory sparing.

In some embodiments, in addition to the channel controllers 214, the memory controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the memory controller 202. Alternatively, in some embodiments, the local memory processor 218 stores data to be written into, or read from, each memory block in the plurality of memory channels 204 in a DRAM buffer 228A that is included in memory device 240, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the memory controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 250 has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

In some embodiments, the memory system 200 includes an SSD having an L2P address indirection table 250 that stores physical addresses for a set of logical addresses, e.g., a logical block address (LBA). In some embodiments, the L2P address indirection table 250 is stored in an L2P table cache 212 included in the memory controller 202. Alternatively, in some embodiments, the memory system 200 includes a DRAM buffer 228A, and the L2P address indirection table 250 is stored in the DRAM buffer 228A. The local memory processor 218 of the memory controller 202 accesses the DRAM buffer 228A via a DRAM controller 226.

Figure 3:
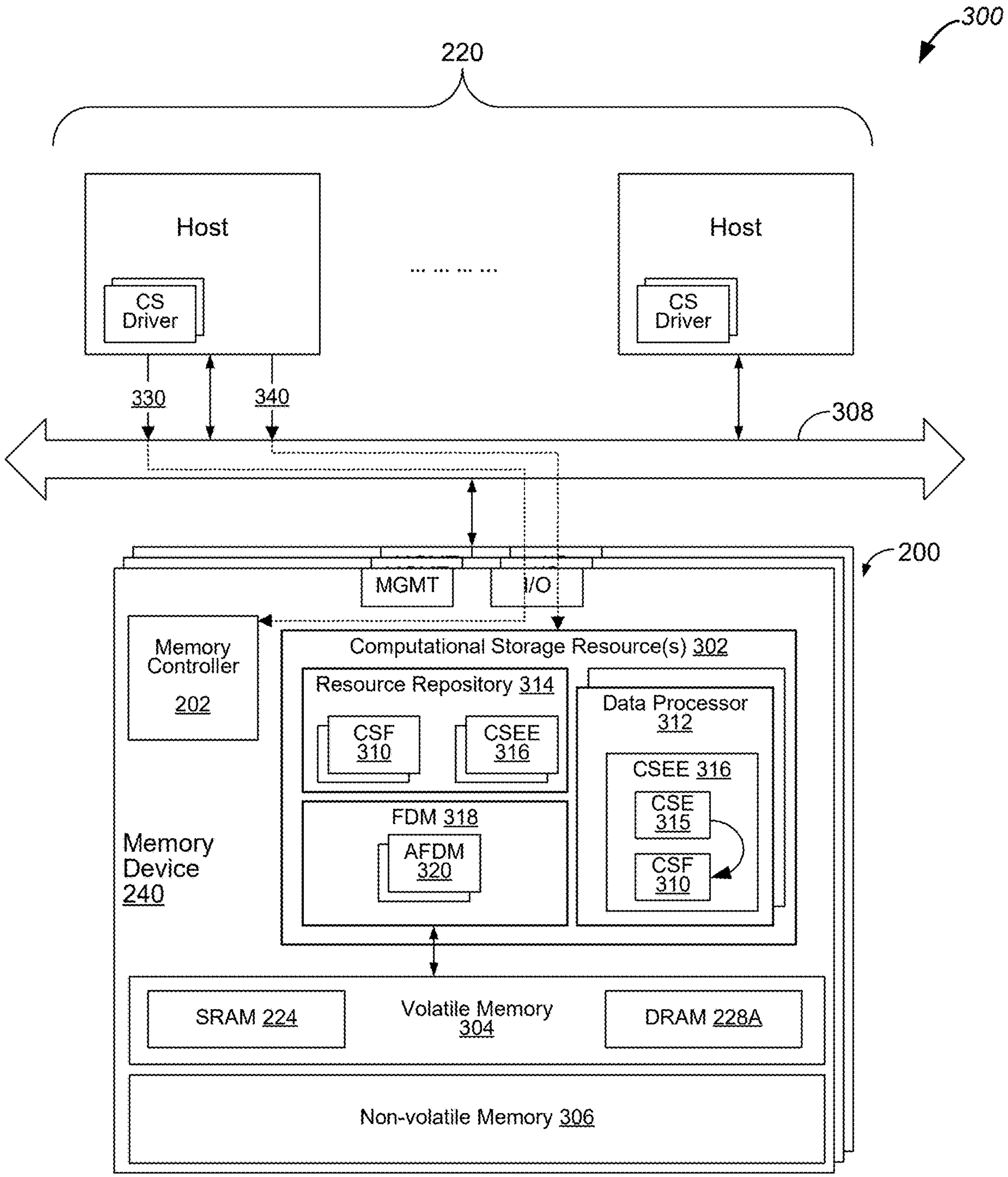
FIG. 3 is a block diagram of an example computer system that includes a memory system having an internal processing capability, in accordance with some embodiments.

FIG. 3 is a block diagram of an example computer system 300 that includes a memory system 200 having an internal processing capability, in accordance with some embodiments. The memory system 200 is also called a computational storage device (CSD), and includes one or more memory devices 240 (e.g., SSDs). Each memory device 240 further includes a memory controller 202, a volatile memory 304, and a non-volatile memory 306 (e.g., memory channels 204). The host device(s) 220 and the one or more memory devices 240 of the memory system 200 are coupled to each other via a communication fabric 308. The communication fabric 308 includes the one or more communication buses 140 (FIG. 1) that operates in compliance with a data bus standard, e.g., PCIe, Ethernet standards. The host device(s) 220 are configured to issue memory access requests to write data into, and read data from, the non-volatile memory 306. The memory controller 202 accesses the non-volatile memory 306 in response to the memory access operations. Additionally, in some embodiments, the memory controller 202 dispatch system read requests (also called background read requests or non-host read requests) and system write requests to implement internal memory management functions including, but are not limited to, garbage collection, wear levelling, read disturb mitigation, memory snapshot capturing, memory mirroring, caching, and memory sparing. The volatile memory 304 of each memory device 240 further includes one or more of a L2P table cache 212, a SRAM buffer 224, and a DRAM buffer 228A, and is configured to store data temporarily while the memory controller 202 accesses the non-volatile memory 306 for memory accesses or internal memory management.

In some embodiments, the memory controller 202 is dedicated to processing the memory access requests and internal memory management functions. A memory device 240 further includes one or more computational storage resources (CSRs) 302 configured to implement data processing operations locally on the memory device 240. A set of predefined data processing operations are implemented to perform a computational storage function (CSF) 310, which is distinct from the memory access and internal memory management functions performed by the memory controller 202. In some embodiments, a computational storage resource 302 processes user data that are received from the host device(s) 220 or extracted from the non-volatile memory 306 during the data processing operations. In some embodiments, the processed data are stored into the non-volatile memory 306 or sent to the host device(s) 220 via the communication fabric 308. Further, in some embodiments, a subset of the user data, the process data, and intermediate data generated during the data processing operations is temporarily stored in the volatile memory 304 (e.g., SRAM buffer 224, DRAM buffer 228A).

In some embodiments, the computational storage resource 302 includes one or more data processors 312 and a resource repository 314. The one or more data processors 312 provide a computational storage engine configured to perform one or more predefined data processing operations, e.g., associated with a computational storage function 310 of the computational storage resource 302. In some embodiments, the computational storage function 310 corresponds to an in-memory application associated with the computational storage engine, and is implemented via the computational storage engine in the memory device 240. The resource repository 314 is a centralized location (e.g., memory space) storing distinct types of data and resources, such as software libraries, configuration files, media files, or any other type of data needed for a plurality of computational storage functions 310 performed by the computational storage resource 302. For example, the resource repository 314 stores instructions for creating a computational storage engine environment (CSEE) 316 and instructions for implementing a set of data processing operations associated with a computational storage function 310 in the CSEE 316. Instructions are loaded from the resource repository 314 and executed by the data processor 312, thereby creating the CSEE 316 where the computational storage engine 315 is executed to implement data processing operations associated with the computational storage function 310.

In some embodiments, the computational storage resource 302 further includes a function data memory (FDM) 318 for storing data that are used or generated by the computational storage engine 315 for performing a computational storage function 310. In some embodiments, the function data memory 318 is included in the volatile memory 304. For example, the function data memory 318 corresponds to a portion of the DRAM buffer 228A (FIG. 2). In another example, the function data memory 318 corresponds to a portion of the SRAM buffer 224 (FIG. 2). Further, in some embodiments, a portion of the function data memory 318 (also called an allocated FDM (AFDM) 320) is allocated for one or more instances of a computational storage function 310.

In some embodiments, a host device 220 issues a memory read or write request 330 to a memory device 240 of the memory system 200, and the memory controller 202 of the memory device 240 receives the memory read or write request 330 and accesses the non-volatile memory 306 accordingly. Alternatively, in some embodiments, a host device 220 issues a data processing request 340 to the memory device 240, and a data processor 312 of the computational storage resource 302 (e.g., the computational storage engine 315) receives the data processing request 340 and processes user data extracted from the data processing request or the non-volatile memory 306.

Figure 4:
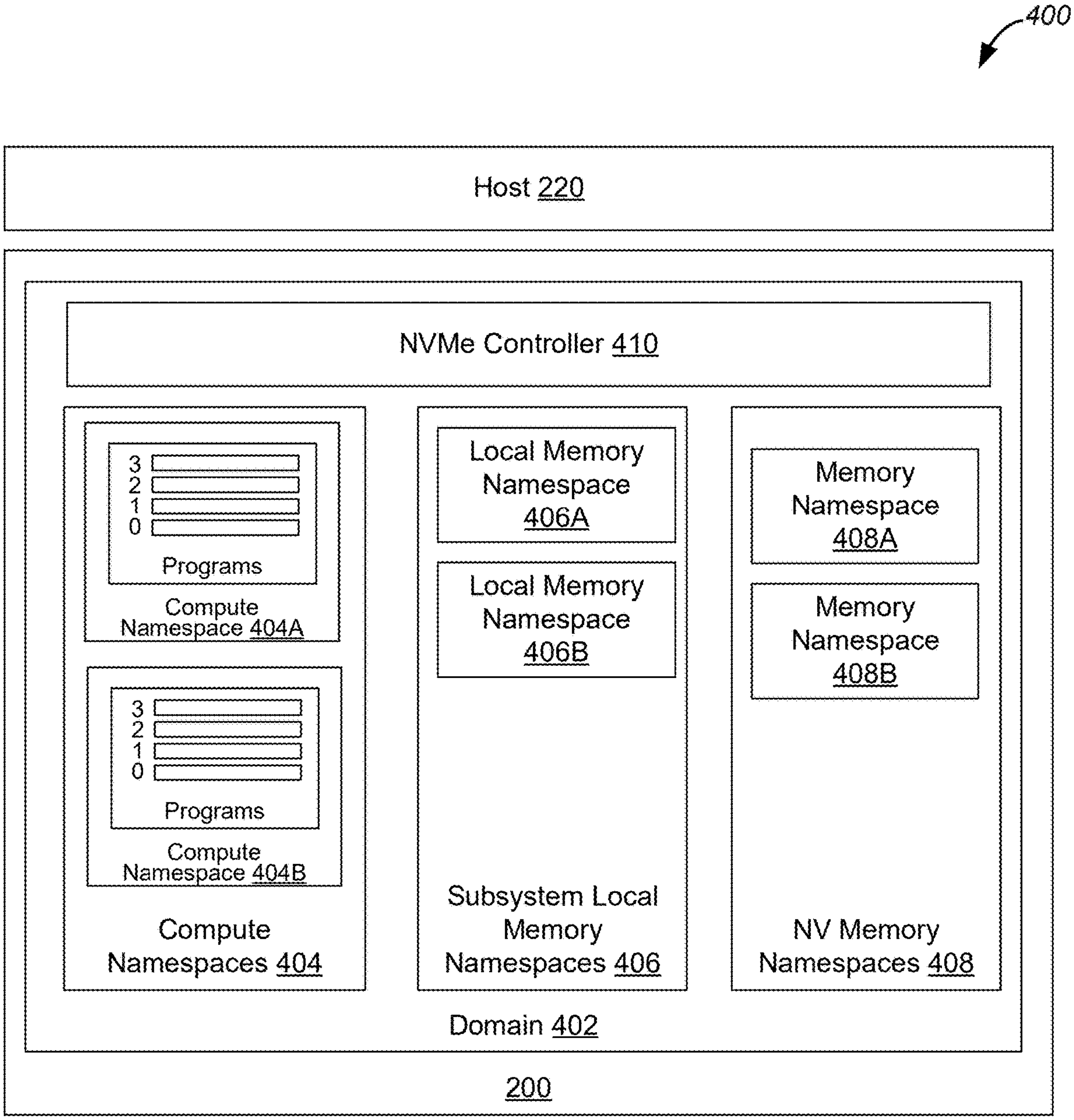
FIG. 4 is a block diagram of an example computer system including a memory system that operates in compliance with a storage access and transport protocol, in accordance with some embodiments.

FIG. 4 is a block diagram of an example computer system 400 including a memory system 200 that operates in compliance with a storage access and transport protocol (e.g., NVMe), in accordance with some embodiments. The memory system 200 includes one or more memory devices 240 each of which corresponds to a domain 402 according to the storage access and transport protocol. Each domain 402 corresponding to a respective memory device 240 includes a one or more compute namespaces 404, local memory namespaces 406, memory namespaces 408, and a domain controller 410. Each namespace is a collection of LBAs accessible to, or associated with, a respective one of the plurality of programs.

A memory device 240 includes one or more processors having a computation capability (e.g., a memory controller 202, a data processor 312), a volatile memory 304 (e.g., a cache 212, a SRAM buffer 224, a DRAM buffer 228A), and a non-volatile memory 306. When the memory device 240 executes a plurality of programs, resources of the memory controller 202, the volatile memory 304, and the non-volatile memory 306 are allocated to implement the plurality of programs based on the storage access and transport protocol (e.g., NVMe). A plurality of compute namespaces 404 (e.g., 404A and 404B) correspond to, are configured to provide, instructions of the plurality of programs executed by the one or more programs of the memory device 240. Resources of the volatile memory 304 are allocated based on a plurality of local memory namespaces 406 (e.g., 406A and 406B) to facilitate execution of the plurality of programs by the memory device 240, so are resources of the non-volatile memory 306 allocated based on a plurality of memory namespaces 408 (e.g., 408A and 408B). It is noted that, in some embodiments, a number of programs is not limited to 2 and may be greater than 2, thereby creating more than two namespaces in each type of compute namespaces 404, 406, or 408.

In an example, a compute namespace 404A corresponds to a respective local memory namespace 406A and a respective non-volatile memory namespace 408A. The compute namespace 404A provides instructions of a corresponding program for execution by the one or more processors of the memory device 240. In some embodiments, input data that are processed, and output data that are generated, by these instructions are temporarily stored based on the local memory namespace 406A. In some embodiments, the input data are extracted based on the non-volatile memory namespace 408A, and the output data are stored based on the non-volatile memory namespace 408A. By these means, namespace allocation and utilization in the domain 402 corresponding to the memory device 240 are managed according to the storage access and transport protocol.

In some embodiments, the storage access and transport protocol includes an NVMe protocol for accessing flash storage (e.g., SSDs) via a PCIe bus. The PCIe bus is configured to support a plurality of parallel command queues (e.g., on an order of 104 queues), thereby operating with a substantially high throughput and a substantially fast response time. In some embodiments, the host device 220 is configured to communicate and interact with each memory device 240 (e.g., SSD) as a standard NVMe storage device using the NVMe protocol. The host device 220 is configured to read and write data and implement data processing operations on the memory device 240 using NVMe commands.

In some embodiments, the host device 220 executes an OS (e.g., a Linux OS) on a host side, and the CSRs 302 (FIG. 3) of the memory device 240 executes the guest OS (e.g., an embedded Linux OS) on a storage side.

In some embodiments, a memory device 240 (also called a storage device) includes a plurality of processing cores, and is transformed to a computational storage device (CSD) by activating a computational storage configuring two separate subsets of processing cores to a memory controller 202 and a data processor (e.g., data processor 312 in FIG. 3), respectively. The data processor is configured to process internal computational storage operations (e.g., data processing operations) locally on the memory device 240, while the memory controller 202 of the memory device 240 specializes in performing generic storage functions including memory access functions (e.g., input/output (I/O) access operations) and internal memory management functions. In some embodiments, the memory controller 202 and the data processor of the memory device 240 at least partially share certain hardware resources in a time-multiplexed manner. The memory device 240 may operate in a computational storage elevation (CSE) mode, when the hardware resources (e.g., processing cores) are allocated to the computational storage functions or adjusted between the memory access functions and the computational storage functions.

Figure 5:
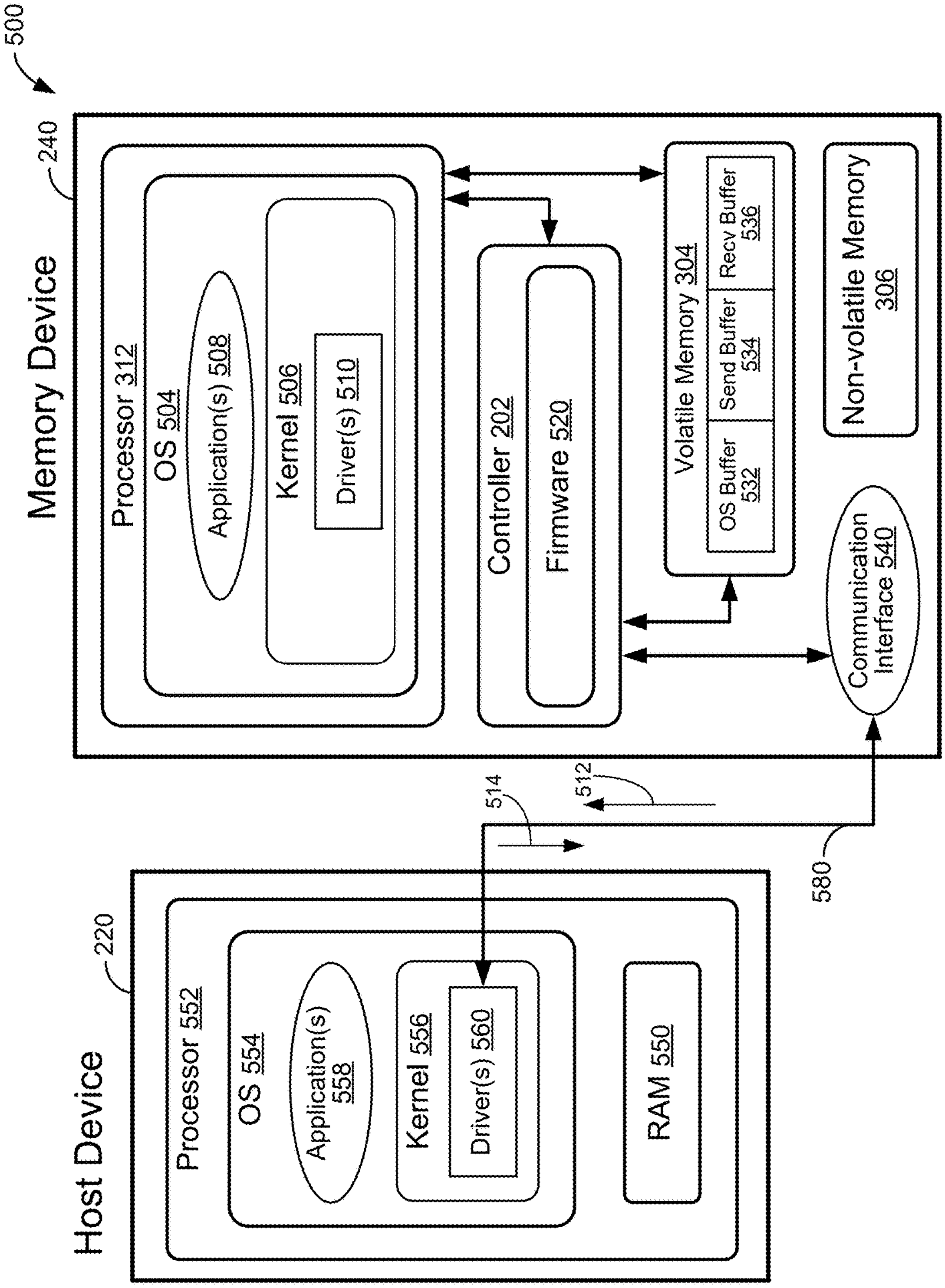
FIG. 5 is an example electronic system configured to communicate data between a memory device and a host device, in accordance with some embodiments.

FIG. 5 is a block diagram of an example electronic system 500 configured to communicate data between a memory device 240 and a host device 220, in accordance with some embodiments. The host device 220 and the memory device 240 are coupled to one another, and communicate data via a communication bus 580. In some embodiments, the communication bus 580 includes a PCIe communication bus. In an example, the communication bus 580 is configured to communicate data between the memory device 240 and the host device 220 according to a PCIe interface standard. In some embodiments, the memory device 240 sends an outgoing data packet 512 to the host device 220 via the communication bus 580. In some embodiments, the outgoing data packet 512 is structured in one or more protocol formats, e.g., including a subset of TCP/IP, NVMe, PCIe, Virtual I/O Device (VirtIO), and other types. Further, in some embodiments, the outgoing data packet 512 includes one or more data segments, and each data segment of the outgoing data packet 512 includes a respective protocol-specific header that has a respective data format defined based on a respective protocol format. For example, a data segment includes a header defined according to VirtIO, which is an interface standard for virtualization that facilitates efficient data communication between virtual machines and physical hardware (e.g., virtual device driver(s)).

In some embodiments, the memory device 240 receives an incoming data packet 514 that are sent from the host device 220 via the communication bus 580, and the incoming data packet 514 is structured in one or more protocol formats, e.g., including a subset of TCP/IP, NVMe, PCIe, VirtIO, and other types. In some embodiments, the host device 220 receives the outgoing data packet 512 sent from the memory device 240 via the communication bus 580, and the memory device 220 receives the incoming data packet 514 sent from the host device 220 via the communication bus 580. Bidirectional communication is established within the communication bus 580 coupled between the memory device 240 and the host device 220. In some embodiments, the memory device 240 acts as a standard NVMe storage device (e.g., a physical device) to the host device 220. The host device 220 accesses data stored in the memory device 240 and controls the memory device 240 using standard NVMe commands. Alternatively, in some embodiments, the memory device 240 acts as a VirtIO virtual network device (e.g., a virtual device) to the host device 220. The host device 220 accesses data stored in the memory device 240 and controls the memory device 240 using virtual device driver(s) based on VirtIO.

In some embodiments, the host device 220 includes a host processor 552 and a random-access memory (RAM) 550. The host processor 552 is configured to execute a host OS 554 (e.g., Linux) jointly with the memory device 240. The host OS 554 includes one or more of: one or more host application(s) 558 for implementing predefined functions and a host kernel 556 including one or more data drivers 560. For example, the host kernel 556 includes one of a set of data drivers 560, e.g., application driver(s) associated with the host application(s) 558, a PCIe/NVMe driver associated with data communication via the communication bus 580, and a VirtIO network driver for emulating a VirtIO device.

The memory device 240 includes a data processor 312, a memory controller 202, a volatile memory 304, a non-volatile memory 306, and an input/output data interface 540. The input/output data interface 540 is configured to couple to the communication bus 580 and communicate data via the communication bus 580. The communication bus 580 is configured to communicate data (e.g., data packets 512 and 514) between the input/output data interface 540 and the host device 220, e.g., according to the PCIe interface standard. The data processor 312 is coupled to the input/output data interface 540. In some embodiments, the data processor 312 is configured to execute a guest OS 504 (e.g., Linux). The guest OS 504 includes device application(s) 508 and an embedded kernel 506. The embedded kernel 506 includes one or more device drivers 510. For example, the embedded kernel 506 includes one of a set of device drivers 510, e.g., a block device driver, a network driver 646 (FIGS. 6B and 6C).

In some embodiments, the memory controller 202 is coupled to the data processor 312, the volatile memory 304, and the input/output data interface 540. The memory controller 202 is distinct from the data processor 312 and configured to execute a firmware 520. In some embodiments, the firmware 520 of the memory controller 202 includes an NVMe firmware for implementing storage functions.

The volatile memory 304 is coupled to the data processor 312 and the memory controller 202. In some embodiments, the volatile memory 304 includes a first buffer portion 532 (e.g., an OS buffer 532) allocated to the data processor 312 and a second buffer portion allocated to the memory controller 202. In some embodiments, the second buffer portion includes an outgoing buffer portion 534 (e.g., a send buffer 534) and a receiving buffer portion 536 (e.g., a receive buffer 536). The send buffer 534 is configured to store data to be sent over the communication bus 580 and the receive buffer 536 is configured to store data received from the communication bus 580. In some embodiments, the volatile memory 304 includes a double data rate dynamic random-access memory (DDR DRAM). In some embodiments, the volatile memory 304 includes the DRAM buffer 228A (FIG. 2), the SRAM buffer 224 (FIG. 2), or both.

The non-volatile memory 306 of the computational storage device 240 is coupled to the data processor 312 and the memory controller 202. The non-volatile memory 306 includes a plurality of memory blocks (e.g., corresponding to a plurality of memory channels 204 in FIG. 2). A subset of the plurality of memory blocks of the non-volatile memory 306 is reserved for the data processor 312. In some embodiments, the non-volatile memory 306 includes NAND flash memory.

In some embodiments, the memory device 240 is emulated and exposed to the host device 220 as a virtual device through a paravirtualized interface. For example, the paravirtualized interface is formed based on a hypervisor, a virtualization firmware, and a virtual machine (e.g., a guest OS) in the memory device 240. More specifically, in some embodiments, the data processor 312 performs as the virtual machine of the host device 220 via the guest OS 504, and the memory device 240 allocates a subset of processing resources to provide the hypervisor and the virtualization firmware for communicating with and managing the device processor 312. Compared with full virtualization, the guest OS 504 of paravirtualization is configured to communicate directly with the hypervisor. This paravirtualization configuration allows the guest OS 504 to make hyper-calls to the hypervisor for resource management and I/O operations, thereby reducing virtualization overhead and enhancing total performance.

Figure 6A:
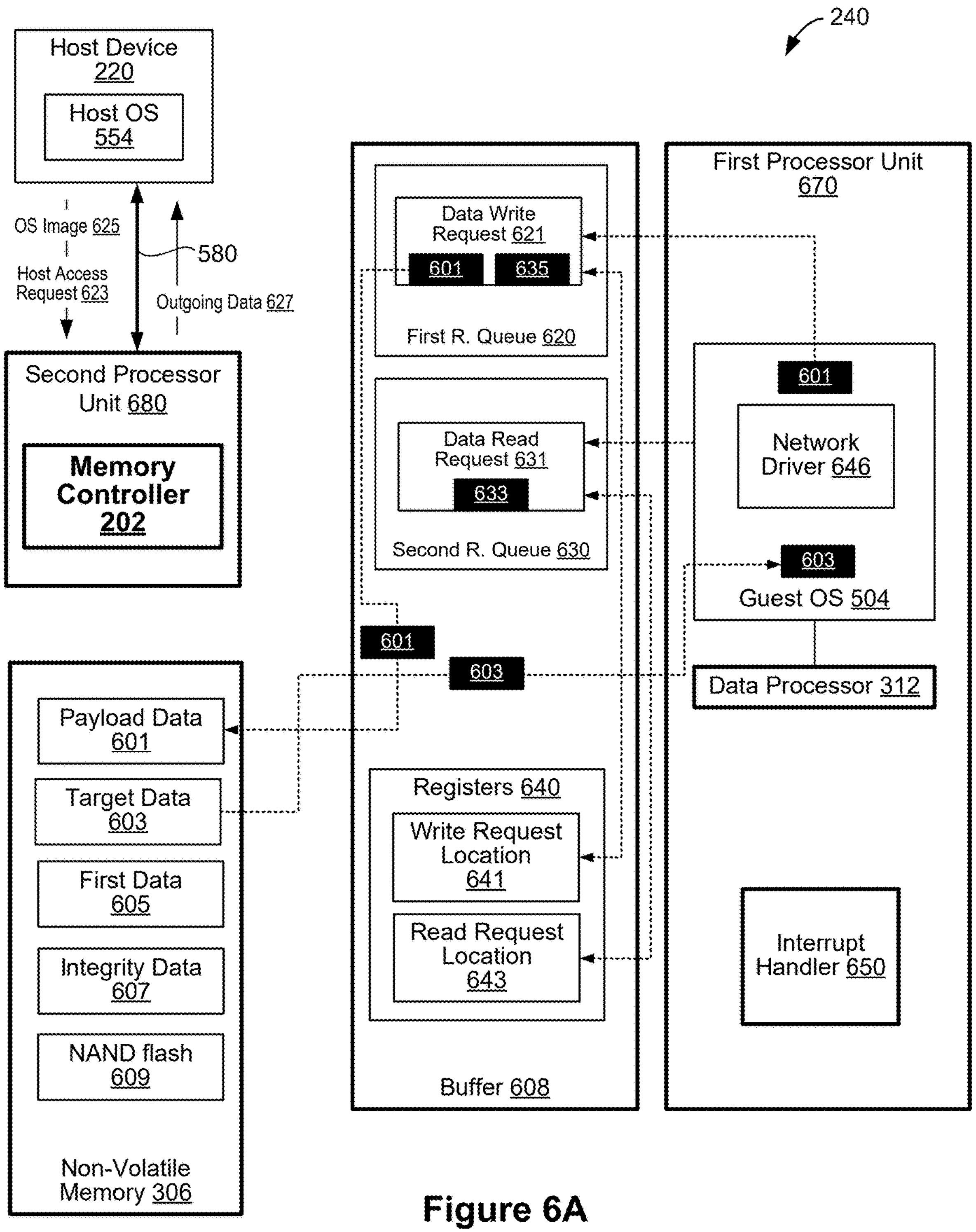
FIG. 6A is a block diagram of an example memory device applied to manage data in support of in-memory data processing, in accordance with some embodiments.
Figure 6B:
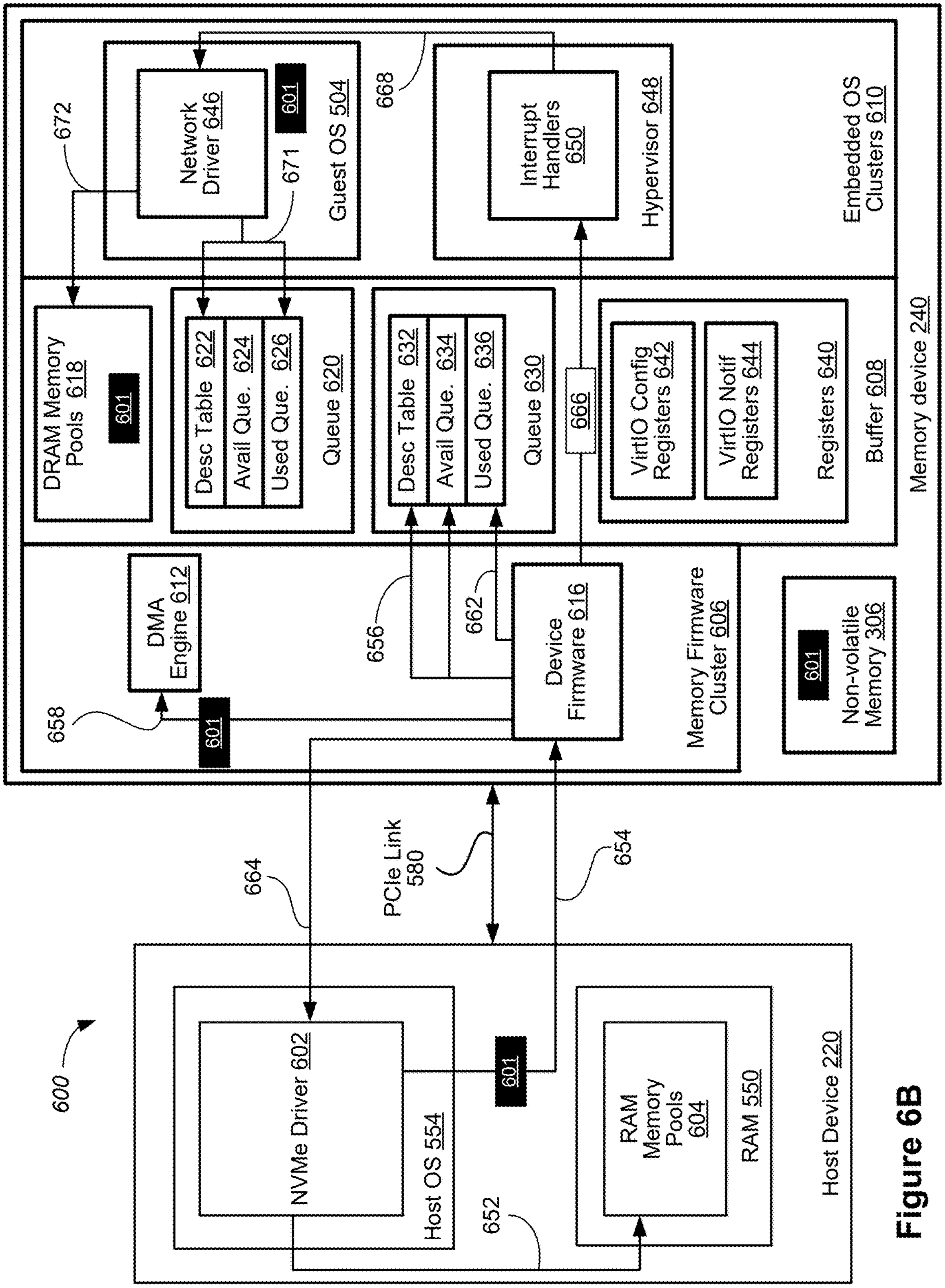
FIGS. 6B to 6D are block diagrams of an example electronic system including a memory device that manages data in support of host-based and in-memory data processing, in accordance with some embodiments.
Figure 6C:
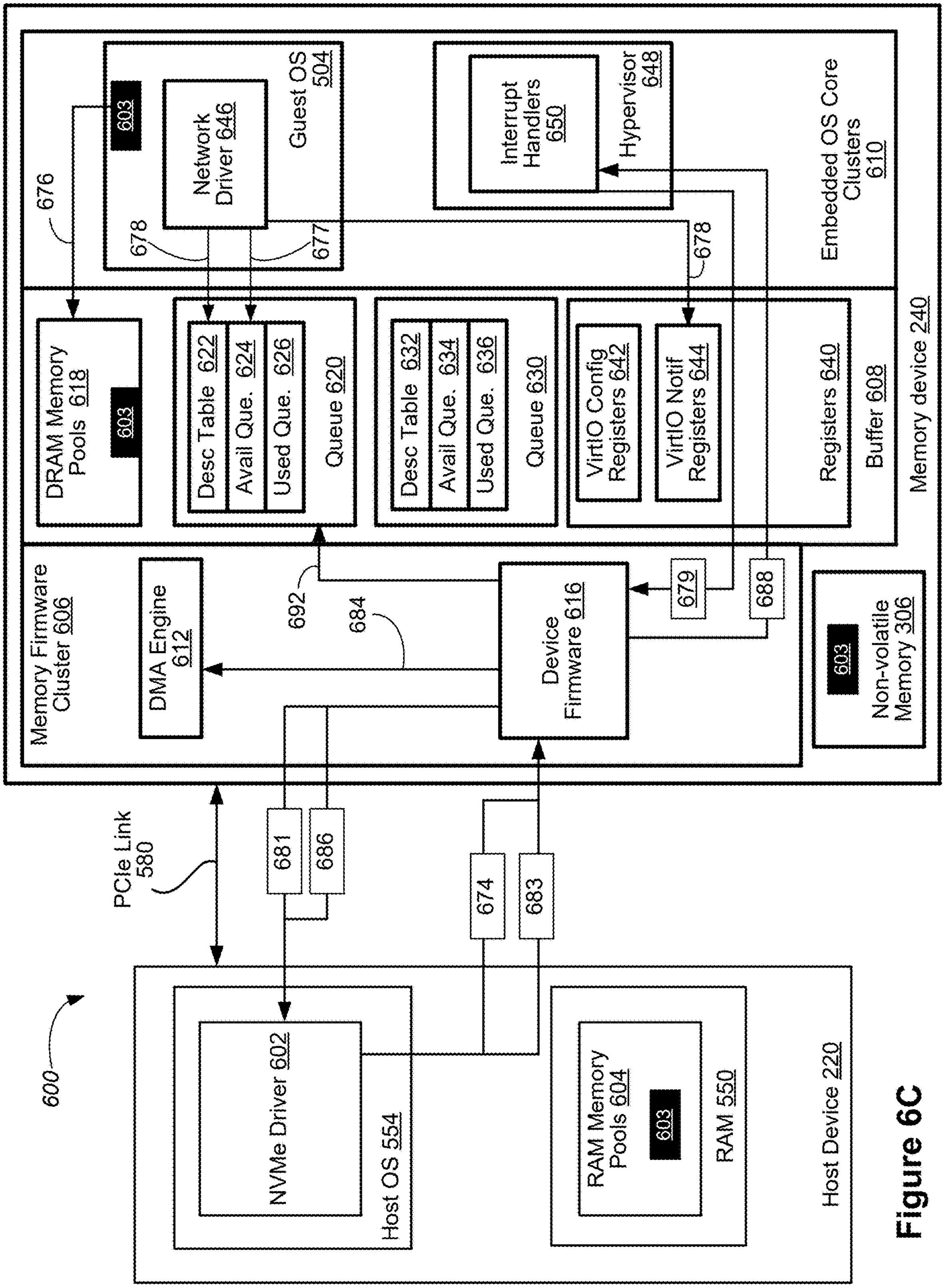

FIG. 6A is a block diagram of an example memory device 240 applied to manage data in support of in-memory data processing, in accordance with some embodiments. The memory device 240 includes a data processor 312, a memory controller 202, a non-volatile memory 306, and a buffer 608 (e.g., a DRAM buffer of an SSD). The memory device 240 reserves a respective register (e.g., a respective register corresponding to a write request location 641 and/or a respective register corresponding to a read request location 643) of the registers 640 in the buffer 608 for storing memory access information associated with the data processor 312 (e.g., information about a data packet that is to be received and/or transmitted). In some embodiments, the respective register corresponds to a VirtIO notification register (e.g., VirtIO notification register(s) 644 in FIG. 6B).

The memory device 240 obtains a notification of a data write request 621 issued by the data processor 312. In response to the notification, the memory controller 202 extracts, from the register 640, a write request location 641 where the data write request 621 is stored. The data write request 621 includes at least payload data 601 to be stored in the non-volatile memory 306. Based on the write request location 641, the data write request 621 including the payload data 601 is extracted from a first request queue 620 (associated with the CSD's embedded OS) stored in the buffer 608. The payload data 601 is written to the non-volatile memory 306 (e.g., a data storage portion of the SSD). In some embodiments, the first request queue 620 is associated with the CSD's guest OS 504, and stored at a different location of the buffer 608 from the registers 640.

In some embodiments, the notification is a first notification. A second notification of a data read request 631 is issued by the data processor 312. In response to the second notification, the memory controller 202 extracts, from the reserved register in the buffer 608, a read request location 643 where the data read request 631 is stored. In accordance with some embodiments, the data read request 631 includes a logical address 633 of the target data 603 (e.g., a logical address within the non-volatile memory 306). Based on the read request location 643, the memory controller 202 extracts, from a second request queue 630 stored in the buffer 608, the data read request 631, including the logical address 633 associated with the target data 603. The memory controller 202 extracts the target data 603 from the non-volatile memory 306 based on the logical address 633. The memory controller 202 provides the target data 603 to the data processor 312 by way of the buffer 608. More specifically, in some embodiments, the memory controller 202 may translate the logical address 633 to a physical address in the non-volatile memory 306, extract the target data 603 from the non-volatile memory 306 based on the physical address, and provide the target data 603 to the data processor 312.

In some embodiments, the memory controller 202 modifies the payload data 601 to generate first data 605 and stores the first data in non-volatile memory 306. Further, in some embodiments, the memory controller 202 modifies the payload data 601 by (i) encrypting the payload data 601, (ii) extracting raw data from the payload data 601 if VirtIO is used, or (iii) generating integrity data 607 supplemental to the payload data 601 for storage (e.g., within the non-volatile memory 306). The first data 605 includes the encrypted payload data or the raw data.

In some embodiments, the data write request 621 includes a logical address 635 of the payload data 601. The memory controller 202 translates the logical address 635 to a physical address in the non-volatile memory 306, and stores the payload data 601 based on the physical address.

In some embodiments, the memory device 240 is coupled to a host device 220 (FIG. 2), and includes an interrupt handler 650. The memory controller 202 receives one or more host access requests 623 issued by the host device 220 (e.g., "INTERRUPT!"). While the one or more host access requests 623 are processed by the memory controller 202 and in response to the notification, the interrupt handler 650 collaborates with the memory controller 202 to suspend processing of the one or more host access requests 623 issued by the host device 220 and process the data write request 621.

In some embodiments, the interrupt handler 650 is loaded on a first processor unit 670, and a subset of the first processor unit 670 is configured to the data processor 312. The first processor unit 670 is separate and distinct from a second processor unit 680 where the memory controller 202 is loaded.

In some embodiments, the data processor 312 obtains an OS image 625 (e.g., provided by the host device 220), and the data processor 312 executes the OS image 625 and loads a guest OS (e.g., guest OS 504) based on the OS image 625. No external driver is installed in the OS image 625 for data communication with the memory controller 202 or a host device 220 coupled to the memory device 240. Stated another way, the guest OS 504 includes one or more drivers that are included in the OS image 625 and loaded jointly with the guest OS 504, and no external driver is installed after installation of the guest OS 504 is completed.

In some embodiments, the data processor 312 runs the guest OS 504, and stores the memory access information on the reserved register 640 in the buffer 608 according to a filesystem of the guest OS 504. In other words, in some embodiments, the guest OS 504 does not need any new driver(s) to be installed to perform the functions of the data processor 312.

In some embodiments, the guest OS 504 includes an embedded virtualized network card input/output driver (e.g., network driver 646). In some embodiments, the data processor 312 generates raw data, converts the raw data to the payload data 601 based on a VirtIO data protocol associated with the network driver 646, and issues the data write request 621 including the payload data 601. Information of the data write request 621 is temporarily stored in the first request queue 620, and a notification may be sent to the memory controller 202 or the interrupt handler 650 indicating that the data write request 621 is waiting in the first request queue 620.

In some embodiments, the memory controller 202 converts the payload data 601 to outgoing data 627 based on a data communication protocol associated with a communication bus 580 (e.g., PCIe) that couples the memory device 240 to a host device 220. The memory controller 202 communicates the outgoing data 627 to the host device 220 via the communication bus 580.

In some embodiments, the data processor 312 runs a guest OS 504. The guest OS 504 includes a network driver 646, and the payload data 601 are generated based on a VirtIO data protocol by the network driver 646.

In some embodiments, VirtIO configurations are applied to configure a VirtIO memory-mapped I/O (MMIO) structure in the memory controller 202. The register 640 further includes one or more VirtIO configuration registers 642 (FIG. 6B) for storing the VirtIO configurations.

In some embodiments, the buffer 608 stores a plurality of memory access request queues (e.g., the first request queue 620 and the second request queue 630) for the data processor 312, and the plurality of memory access request queues include a data write request queue (e.g., the first request queue 620) further including the data write request 621. In some embodiments, a plurality of request addresses of requests in the plurality of memory access request queues are provided to the memory controller 202, e.g., by way of the registers 640. The memory controller 202 processes the plurality of memory access requests queues in parallel based on the plurality of request addresses (e.g., based on data stored in the reserved registers 640). In some embodiments, the data write request queue includes a plurality of different sub-queues (e.g., an available queue 624 (FIG. 6B), a used queue 626 (FIG. 6B), a pending or waiting request queue, a completed request queue, and an active request queue). In some embodiments, operations caused by the data access queues (e.g., queues 620 and 630 in FIG. 6A) are processed at least partially by one or more interrupt handlers 650, and the data access queues are assigned to the one or more interrupt handlers 650. In some embodiments, assignment of the data access queues is negotiated among a plurality of interrupt handlers 650.

In some embodiments, the memory device 240 includes one or more processors. A first subset of the one or more processors is allocated to implement the memory controller 202, and a second subset of the one or more processors is allocated to implement the data processor 312. The second subset of the one or more processors is distinct from the first subset of the one or more processors. Alternatively, in some embodiments, the memory device 240 includes one or more processors. A first time slot of the one or more processors is allocated to implement the memory controller 202, and a second time slot of the one or more processors is allocated to implement the data processor 312. The second time slot is distinct from the first time slot.

In some embodiments, the non-volatile memory 306 includes one or more NAND flash chips 609, and the memory controller 202 is configured to access and manage data stored in the one or more NAND flash chips 609, and the data processor 312 is configured to process the data stored in the one or more NAND flash chips 609.

Figure 6D:
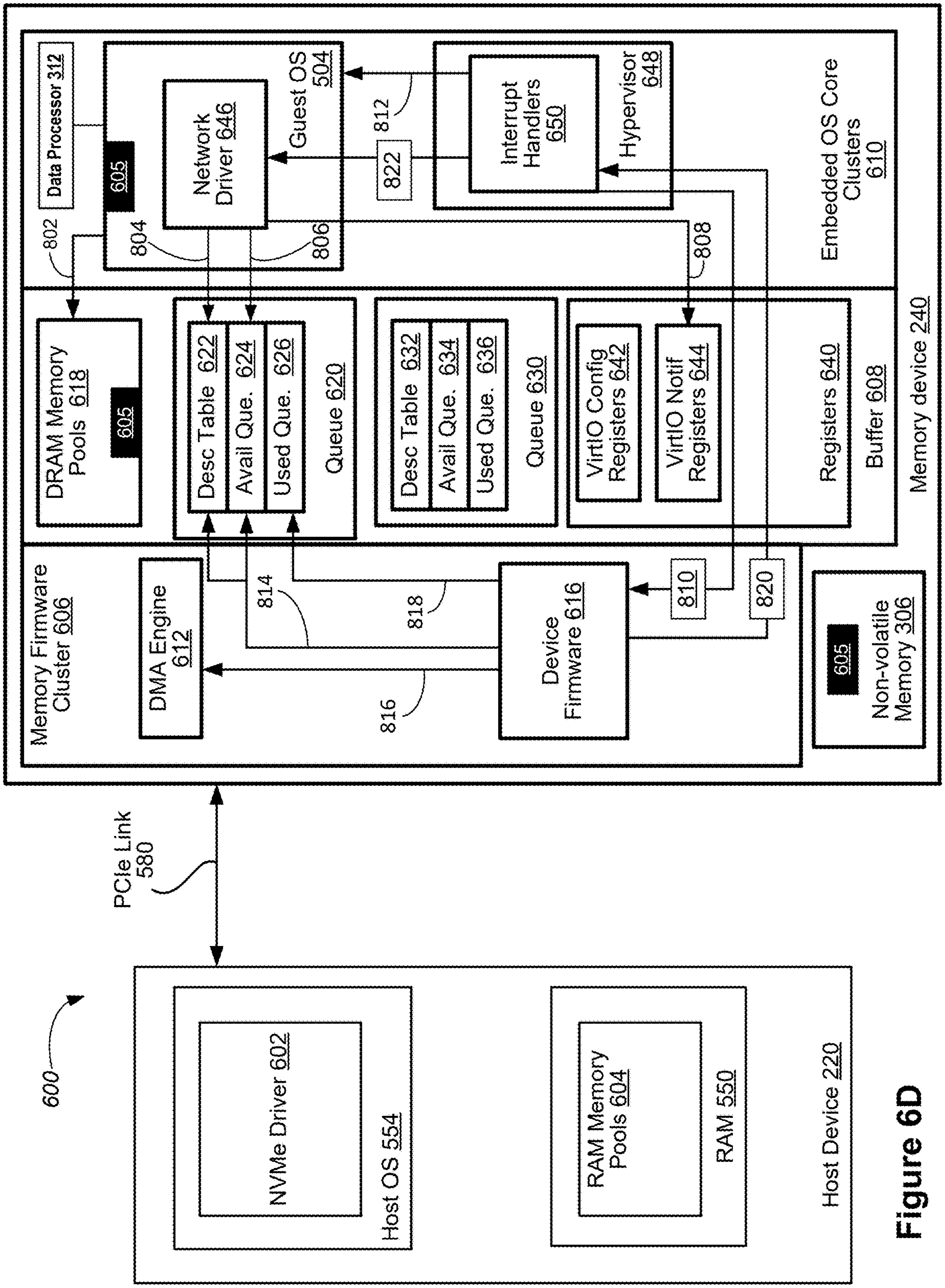

FIGS. 6B to 6D are block diagrams of an example electronic system 600 including a memory device 240 that manages data in support of host-based and in-memory data processing, in accordance with some embodiments. The electronic system includes a host device 220 and the memory device 240. The host device 220 executes a host OS (e.g., a customized Linux OS), which is configured to communicate with a guest OS 504 executed by a data processor 312 of the memory device. In some embodiments, the guest OS 504 is an unmodified distribution of Linux. In some embodiments, the electronic system 600 reads from, and writes to, an addressable portion of a nonvolatile memory 306 that corresponds to a directory location of the guest OS 504 of the memory device 240.

In some embodiments, the host device 220 of the electronic system 600 includes RAM 550 having RAM memory pools 604. The host device 220 executes a host OS 554, and is configured to communicate with the memory controller 202 (e.g., via the communication bus 580). The host OS 554 includes an NVMe driver 602 configured to provide tunneling for transmitted write and read packets to and from the memory device 240.

In some embodiments, the electronic system 600 includes one or more memory firmware clusters 606 (e.g., SSD firmware clusters), which further include firmware components for causing performance of the operations (e.g., processing memory access requests and internal memory management functions) described herein. For example, the memory firmware clusters 606 include a device firmware 616 (e.g., an SSD device firmware) and a direct memory access (DMA) engine 612. In some embodiments, modules of the memory firmware clusters 606 are configured to function as the memory controller 202.

In some embodiments, the electronic system 600 includes one or more embedded OS clusters 610, for hosting embedded OSs, including the guest OS 504 that has a network driver 646. The network driver 646 is configured to communicate with the device firmware 616 of the memory firmware clusters 606, (e.g., via an MMIO).

Referring to FIG. 6B, in some embodiments, data is transmitted to, and read by, the embedded OS 504 of the embedded OS clusters 610 (e.g., including a data processor 312). In some embodiments, target data 603 are stored in the non-volatile memory 306, extracted from the non-volatile memory 306, and sent to the embedded OS 504. Alternatively, in some embodiments, an NVMe driver 602 of the host OS 554 allocates (operation 652) RAM 550 for payload data 601 to be transmitted to the guest OS 504 (e.g., using a VU command associated with a parallel redundancy protocol (PRP)). In some embodiments, the RAM 550 for the payload data 601 is allocated to one or more RAM memory pools 604 of the RAM 550. After the RAM 550 has been allocated, the NVMe driver 602 issues (operation 654) an NVMe VU transmit command to the device firmware 616. After receiving the transmit command from the NVMe driver 602, the device firmware 616 (e.g., corresponding to the memory controller 202) finds (operation 656) an available buffer DMA destination address using available queue 634 and descriptor table 632 of a second request queue 630.

The device firmware 616 finds the available buffer for the DMA destination address, and provides (operation 658) instructions to the DMA engine 612 to move the payload data 601 from the host device 220 to the embedded OS 504. The payload data 601 is then moved from the host OS 554 to a DRAM memory pools 618 (e.g., a buffer) for further transfer to the embedded OS 504. The device firmware 616 adds (operation 662) a corresponding descriptor index to the used queue 636 of the second request queue 630. After the DMA transfer has been completed, the device firmware 616 sends (operation 664) a notification of completion of the transfer to the NVMe driver 602 of the host OS 554.

In some embodiments, the device firmware 616 sends a software-generated interrupt 666 to the interrupt handlers 650 of the hypervisor 648 to notify the embedded OS 504 about the payload data 601. Upon receiving the interrupt 666 from the device firmware 616, the hypervisor 648 sends (operation 668) a virtual interrupt (e.g., a vIRQ interrupt) to the network driver 646 of the embedded OS 504 about availability of the payload data 601. After receiving the vIRQ interrupt, the network driver 646 of the embedded OS 504 searches (operation 671) the first request queue 620 to find a physical address of the payload data 601 using the descriptor table 622 and the used queue 626 of the first request queue 620. Based on the physical address of the payload data 601, the network driver 646 reads (operation 672) the payload data 601 from the DRAM memory pools 618, thereby allowing the guest OS 504 executed by the data processor 312 to obtain the payload data 601 provided by the host device 220.

Referring to FIG. 6C, in some embodiments, the NVMe driver 602 of the host OS 554 sends (operation 674) an NVMe asynchronous event to the device firmware 616. The network driver 646 allocates a memory buffer in the DRAM memory pools 618 and writes (operation 676) target data 603. In some embodiments, the memory buffer allocated in the DRAM memory pool 618 includes a directory of the guest OS 504 for storing the target data 603. The network driver 646 moves (operation 677) a physical address of the target data 603 within the pools 618 to an available queue 624 in a descriptor table 622 of the first request queue 620, and adds (operation 678) an index from the descriptor table 622 to an available queue 624. The network driver 646 notifies (operation 678) the VirtIO notification registers 644 (e.g., via MMIO transport) about the target data 603 being written into the memory buffer of the DRAM memory pools 618. The registers 644 receive a notification from the network driver 646, and the interrupt handlers 650 of the hypervisor 648 send a software generated interrupt 679 to the device firmware 616 (e.g., which corresponds to the memory controller 202), to notify the device firmware 616 of a data write request for writing the target data 603 into the non-volatile memory 306.

Upon receiving the software generated interrupt 679, the device firmware 616 queries (operation 692) the first request queue 620 to find a physical address of packet for DMA based on the new element in the descriptor table 622 and the available queue 624. In some embodiments, the device firmware 616 and/or the DMA engine 612 move data from the DRAM memory pools 618 associated with the embedded OS 504 to the non-volatile memory 306. Alternatively, in some embodiments, the device firmware 616 further sends (operation 681) an asynchronous completion event to the NVMe driver 602 of the host OS 554. The network driver 646 allocates (operation 682) RAM 550 for the target data 603. In accordance with receiving the asynchronous completion event, the NVMe driver 602 of the host OS 554 sends (operation 683) a receive command to the device firmware 616. After receiving the command from the NVMe driver 602 of the host OS 554, the device firmware 616 instructs (operation 684) the DMA engine 612 to move data from the embedded OS 504 to the host OS 554. In accordance with receiving the instructions, the DMA engine 612 sends the target data 603 from the embedded OS 504 to the host device 220 (e.g., via the DRAM memory pools 618). The device firmware 616 sends (operation 686) an NVMe VU receive completion notification to the NVMe driver 602 of the host OS 554.

After storing the target data 603 in the non-volatile memory 306 or the host device 220, the device firmware 616 adds the corresponding descriptor index of the DMA packet to the used queue 626 of the second request queue. The device firmware 616 further returns an interrupt 688 to the interrupt handlers 650 of the hypervisor 648. Upon receiving the interrupt 688, the hypervisor 648 sends a vIRQ virtual interrupt to the network driver 646 of the embedded OS 504, and the NVMe driver 602 of the host OS 554 unmasks the event and receives command completion from the device firmware 616.

Referring to FIG. 6D, in some embodiments, the data processor 312 initiates a media write operation for writing target data 605 to non-volatile memory of the memory device 240. The data processor 312 allocates a buffer in the DRAM memory pools 618 for the media write operation to occur (operation 802). In accordance with causing the buffer to be allocated in the DRAM memory pools 618, the data processor 312 (i) adds the physical address of the buffer in the DRAM memory pools to the descriptor table 622 (operation 804), and (ii) adds descriptor table indices to the available queue of the first request queue 620 (operation 806).

After causing the allocation of the buffer in the DRAM memory pools 618, the network driver 646 performs a write operation directed to the VirtIO notification registers 644 (e.g., via memory-mapped I/O transport) (operation 808), which causes an interrupt to be triggered at the interrupt handlers 650. In some embodiments, emulation of memory mapped I/O is used (e.g., through MMU 2 stage address translation) to emulate register behavior via the virtualization firmware of the memory device 240. In accordance with the write operation at the VirtIO notification registers 644, the interrupt handlers 650 cause a software-generated interrupt 810 (e.g., a GIC-500 SGI interrupt) to be provided to the device firmware 616, to notify the device firmware 616 of the media write request for writing the target data 603 into the non-volatile memory 306.

After the software-generated interrupt 810 is provided to the device firmware 616, the interrupt handlers cause operational controls to be returned to the guest OS 504 (operation 812). The device firmware 616 locates respective source addresses within the descriptor table 622 and the available queue 624 for performing a NAND write operation with the first request queue 620 (operation 814). And the device firmware 616 performs one or more firmware and/or hardware operations (e.g., using the DMA engine 612) to move data from a buffer allocated by the network driver 646 to the non-volatile memory 306 (operation 816).

In accordance with the one or more firmware and/or hardware operations being performed, the device firmware 616 causes the descriptor table index of the write buffer to be added to the used queue 626 to indicate that the job has been completed (818). The device firmware 616 further returns an interrupt 820 to the interrupt handlers 650 of the hypervisor 648, including a notification that the job related to the allocated buffer for the target data 605 has been completed. In accordance with receiving the interrupt 820, the interrupt handlers 650 provide a virtual interrupt 822 to the network driver 646, which can be configured to simulate an interrupt line presented in a device tree (e.g., a Linux-based concept for describing an embedded system where Linux is being loaded).

Figure 7:
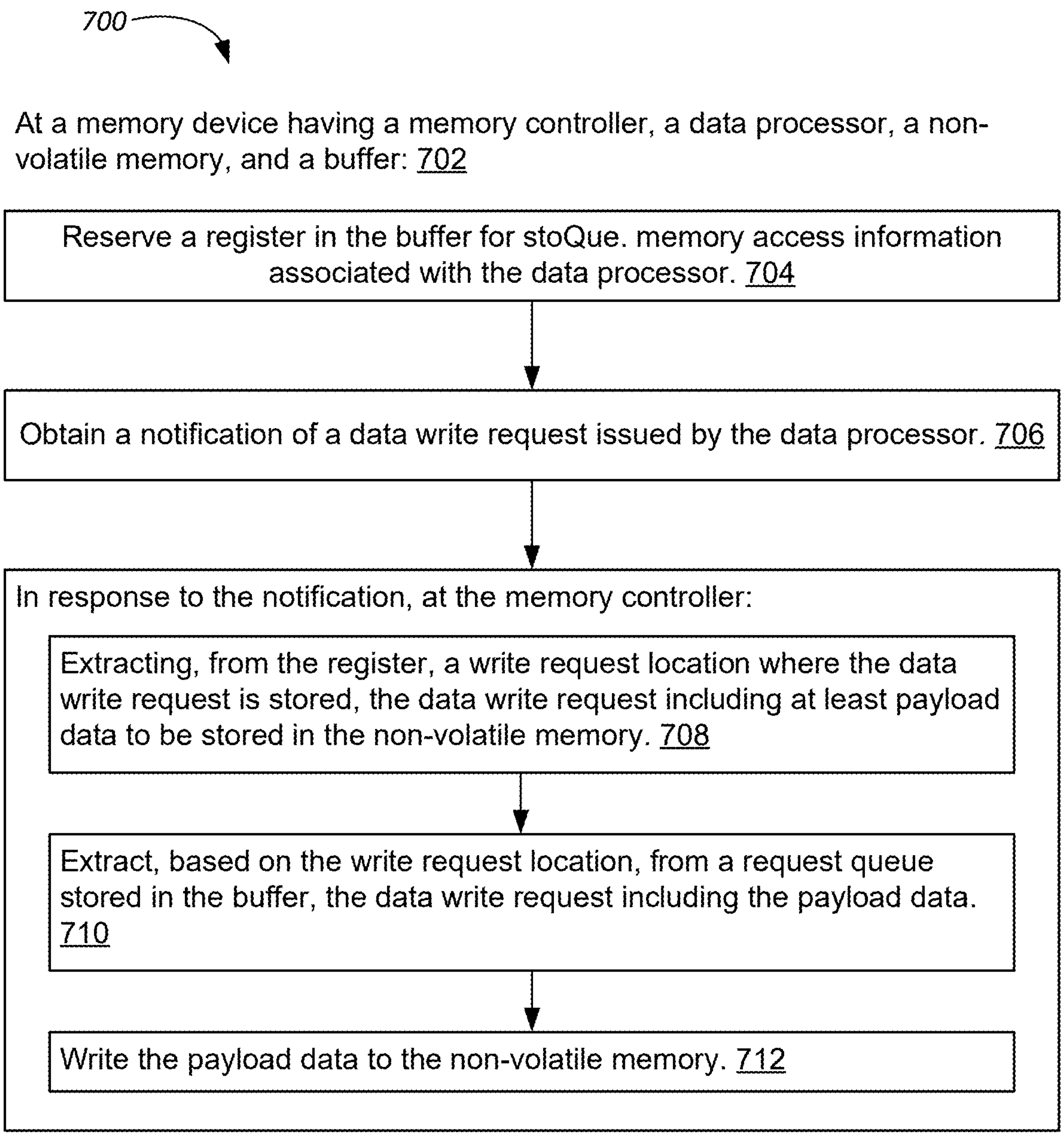
FIG. 7 is a flow diagram of an example method for managing data in support of in-memory data processing, in accordance with some embodiments.

FIG. 7 is a flow diagram of an example method 700 for managing data stored in a memory device in support of in-memory data processing, in accordance with some embodiments. The method 700 is implemented (operation 702) at a memory device 240 (FIGS. 2 and 3) to access data (e.g., including instructions), and the memory device 240 includes a data processor 312, a memory controller 202, a non-volatile memory 306, and a buffer. The memory device reserves (operation 704) a register (e.g., the VirtIO notification registers 644) in the buffer (e.g., a DRAM buffer of an SSD) for storing memory access information associated with the data processor. In some embodiments, the register corresponds to a VirtIO notification register of the host OS. The memory device obtains (operation 706) a notification of a data write request issued by the data processor. The method 700 further includes, at the memory controller in response to the notification, extracts (operation 708), from the register, a write request location where the data write request is stored, the data write request including at least payload data to be stored in the non-volatile memory. The method 700 further includes extracting (operation 710), based on the write request location, from a request queue (associated with the CSD's embedded OS) stored in the buffer, the data write request including the payload data and writing (operation 712) the payload data to the non-volatile memory (e.g., a data storage portion of the SSD). In some embodiments, the request queue is associated with the CSD's embedded OS, and located at a different position from the register.

Stated another way, in some embodiments, the method 700 is implemented based on a memory address provided in a directory of an embedded guest OS 504 (FIG. 6A), and the directory includes the request queue. The embedded guest OS 504 is implemented at a data processor 312 of the memory device 240, and issues a data access request (e.g., a data write request, a data read request) by storing, in the directory, information of the data access request. A notification of the data access request is generated to initiate a data write or read operation for the data processor. The embedded guest OS 504 does not need to be customized or load any driver to write new data into the non-volatile memory 306 or read existing in the non-volatile memory. An interrupt handler 650 (FIGS. 6A-6D) is executed in the memory device 240 to manage the notification and facilitate interaction between the memory controller 202 and the request queues 620 and 630 of the embedded guest OS 504.

Memory is also used to store instructions and data associated with the method 700, and includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 700.

Numerous examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A method for managing data, comprising: at a memory device having a memory controller, a data processor, a non-volatile memory, and a buffer: reserving a register in the buffer for storing memory access information associated with the data processor; obtaining a notification of a data write request issued by the data processor; and in response to the notification, at the memory controller: extracting, from the register, a write request location where the data write request is stored, the data write request including at least payload data to be stored in the non-volatile memory; extracting, based on the write request location, from a request queue stored in the buffer, the data write request including the payload data; and writing the payload data to the non-volatile memory.

Clause 2. The method of clause 1, wherein the notification is a first notification, and the method further comprises: obtaining a second notification of a data read request issued by the data processor; and in response to the second notification, by the memory controller: extracting, from the reserved register in the buffer, a read request location where the data read request is stored, the data read request including a logical address of target data; based on the read request location, extracting, from a request queue stored in the buffer, the data read request including the logical address; extracting the target data from the non-volatile memory based on the logical address; and providing the target data to the data processor by way of the buffer.

Clause 3. The method of one of clause 1 or 2, further comprising, at the memory controller, modifying the payload data to generate first data and storing the first data in the non-volatile memory.

Clause 4. The method of any one of clauses 1-3, wherein the data write request includes a logical address of the payload data, and the method further comprises, translating, via the memory controller, the logical address to a physical address in the non-volatile memory, and storing the payload data in the physical address.

Clause 5. The method of any of clauses 1-4, wherein the memory device is coupled to a host device, and includes an interrupt handler, the method further comprises, receiving, by the memory controller, one or more host access requests issued by the host device; and while the one or more host access requests are processed and in response to the notification, suspending by the interrupt handler processing of the one or more host access requests issued by the host device to process the data write request.

Clause 6. The method of clause 5, wherein the interrupt handler is loaded on a first processor unit, a subset of the first processor unit is configured to the data processor, and the first processor unit is separate and distinct from a second processor unit where the memory controller is loaded.

Clause 7. The method of any one of clauses 1-6, further comprising: obtaining an OS image by the data processor; and executing the OS image by the data processor, including: (i) loading a guest OS based on the OS image; and (ii) aborting installation of an external driver for data communication with the memory controller or a host device coupled to the memory device.

Clause 8. The method of clause 7, further comprising running the guest OS by the data processor; and storing the memory access information on the reserved register in the buffer according to a filesystem of the guest OS.

Clause 9. The method of one of clause 7 or 8, wherein the guest OS includes an embedded virtualized network card input/output (VirtIO) driver, the method further comprising, by the data processor: generating raw data; converting the raw data to the payload data based on a VirtIO data protocol by the VirtIO driver; and issuing the data write request including the payload data.

Clause 10. The method of clause 9, further comprising: converting the payload data to outgoing data based on a data communication protocol associated with a data bus that couples the memory device to a host device; and communicating the outgoing data to the host device via the data bus.

Clause 11. The method of any one of clauses 1-10, further comprising: running a guest OS by the data processor, wherein the guest OS includes an embedded VirtIO driver, and the payload data are generated based on a VirtIO data protocol by the embedded VirtIO driver.

Clause 12. The method of any one of clauses 1-11, further comprising: applying VirtIO configurations to configure a VirtIO memory-mapped I/O (MMIO) structure in the memory controller.

Clause 13. The method of any one of clauses 1-12, wherein the buffer stores a plurality of memory access request queues for the data processor, and the plurality of memory access request queues include a data write request queue further including the data write request, the method further comprising: providing a plurality of request addresses of requests in the plurality of memory access request queues to the memory controller; and processing, by the memory controller, the plurality of memory access request queues in parallel based on the plurality of request addresses.

Clause 14. The method of any one of clauses 1-13, wherein the memory device includes one or more processors, further comprising: allocating a first subset of the one or more processors to the memory controller; and allocating a second subset of the one or more processors to the data processor, wherein the second subset is distinct from the first subset.

Clause 15. The method of any one of clauses 1-14, wherein the memory device includes one or more processors, further comprising: allocating a first time slot of the one or more processors to the memory controller; and allocating a second time slot of the one or more processors to the data processor, wherein the second time slot is distinct from the first time slot.

Clause 16. The method of any one of clauses 1-15, wherein the memory device includes one or more NAND flash chips, and the memory controller is configured to access and manage data stored in the one or more NAND flash chips, and the data processor is configured to process the data stored in the one or more NAND flash chips.

Clause 17. A method for managing data, comprising: at a memory device having a memory controller, a data processor, a non-volatile memory, and a buffer: reserving a register in the buffer for storing memory access information associated with the data processor; obtaining a notification of a data write request issued by the data processor; and in response to the notification, at the memory controller: extracting, from the register, a write request location where the data write request is stored, the data write request including at least payload data to be stored in the non-volatile memory; extracting, based on the write request location, from a request queue stored in the buffer, the data write request including the payload data; and providing the payload data to a host device coupled to the memory device.

Clause 18. A method for managing data, comprising: at a memory device having a memory controller, a data processor, a non-volatile memory, and a buffer: reserving a register in the buffer for storing memory access information associated with the data processor; obtaining a notification of a data read request issued by the data processor; in response to the notification, at the memory controller, extracting, from the reserved register in the buffer, a read request location where the data read request is stored, the data read request including a logical address of target data; based on the read request location; extracting, from a request queue stored in the buffer, the data read request including the logical address; extracting the target data from the non-volatile memory based on the logical address; and providing the target data to the data processor by way of the buffer.

Clause 19. A method for managing data, comprising: at a memory device having a memory controller, a data processor, a non-volatile memory, and a buffer: reserving a register in the buffer for storing memory access information associated with the data processor; obtaining a notification of a data read request issued by the data processor; in response to the notification, at the memory controller, extracting, from the reserved register in the buffer, a read request location where the data read request is stored, the data read request including a logical address of target data; based on the read request location; extracting, from a request queue stored in the buffer, the data read request including the logical address; obtaining the target data from a host device coupled to the memory device based on the logical address; and providing the target data to the data processor by way of the buffer.

Clause 20. A memory device, comprising: one or more processors; and memory, comprising instructions which, when executed by one or more processors, cause the one or more processors to perform operations of any one of clauses 1-19.

Clause 21. A non-transitory computer-readable storage medium comprising instructions which, when executed by one or more processors, cause the one or more processors to perform operations of any one of clauses 1-19.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

What is claimed is:

1. A method for managing data, comprising:

at a memory device having a memory controller, a data processor, a non-volatile memory, and a buffer:

reserving a register in the buffer for storing memory access information associated with the data processor;

obtaining an operating system (OS) image by the data processor;

executing the OS image by the data processor, including:

loading a guest OS based on the OS image; and aborting installation of an external driver for data communication with the memory controller or a host device coupled to the memory device;

obtaining a notification of a data write request issued by the data processor; and in response to the notification, at the memory controller:
extracting, from the register, a write request location where the data write request is stored;
extracting, based on the write request location, from a first request queue stored in the buffer, the data write request including payload data; and
writing the payload data to the non-volatile memory.

2. The method of claim 1, wherein the notification is a first notification, and the method further comprises:
obtaining a second notification of a data read request issued by the data processor; and
in response to the second notification, by the memory controller:
extracting, from the reserved register in the buffer, a read request location where the data read request is stored, the data read request including a logical address of target data;
based on the read request location, extracting, from a second request queue stored in the buffer, the data read request including the logical address;
extracting the target data from the non-volatile memory based on the logical address; and
providing the target data to the data processor by way of the buffer.

3. The method of one of claim 1, further comprising, at the memory controller, modifying the payload data to generate first data and storing the first data in the non-volatile memory.

4. The method of claim 1, wherein the data write request includes a logical address of the payload data, and the method further comprises:
translating, via the memory controller, the logical address to a physical address in the non-volatile memory, and storing the payload data in the physical address.

5. The method of claim 1, wherein the memory device is coupled to the host device, and includes an interrupt handler, the method further comprising:
receiving, by the memory controller, one or more host access requests issued by the host device; and
wherein while the one or more host access requests are processed and in response to the notification, the interrupt handler collaborates with the memory controller to suspend processing of the one or more host access requests issued by the host device and process the data write request.

6. The method of claim 5, wherein:
the interrupt handler is loaded on a first processor unit,
a subset of the first processor unit is configured to the data processor, and
the first processor unit is separate and distinct from a second processor unit where the memory controller is loaded.

7. The method of claim 1, further comprising:
running the guest OS by the data processor; and
storing the memory access information on the reserved register in the buffer according to a filesystem of the guest OS.

8. The method of one of claim 1, wherein the guest OS includes an embedded virtualized network card input/output (VirtIO) driver, the method further comprising, by the data processor:
generating raw data;
converting the raw data to the payload data based on a VirtIO data protocol by the VirtIO driver; and
issuing the data write request including the payload data.

9. The method of claim 8, further comprising:
converting the payload data to outgoing data based on a data communication protocol associated with a data bus that couples the memory device to the host device; and
communicating the outgoing data to the host device via the data bus.

10. The method of claim 1, further comprising:
running the guest OS by the data processor, wherein the guest OS includes an embedded VirtIO driver, and the payload data are generated based on a virtualized network card input/output (VirtIO) data protocol by the embedded VirtIO driver.

11. The method of claim 1, further comprising:
applying virtualized network card input/output (VirtIO) configurations to configure a VirtIO memory-mapped I/O (MMIO) structure in the memory controller.

12. A memory device, comprising:
one or more processors configured to provide a memory controller and a data processor;
a non-volatile memory;
a buffer; and
memory storing one or more programs, the one or more programs comprising instructions which, when executed by one or more processors, cause the one or more processors to perform:
reserving a register in the buffer for storing memory access information associated with the data processor;
obtaining an operating system (OS) image by the data processor:
executing the OS image by the data processor, including:
loading a guest OS based on the OS image; and
aborting installation of an external driver for data communication with the memory controller or a host device coupled to the memory device;
obtaining a notification of a data write request issued by the data processor; and
in response to the notification, at the memory controller:
extracting, from the register, a write request location where the data write request is stored;
extracting, based on the write request location, from a request queue stored in the buffer, the data write request including payload data; and
writing the payload data to the non-volatile memory.

13. The memory device of claim 12, wherein the buffer stores a plurality of memory access request queues for the data processor, and the plurality of memory access request queues include a data write request queue further including the data write request, the one or more programs further comprising instructions for:
providing a plurality of request addresses of requests in the plurality of memory access request queues to the memory controller; and
processing, by the memory controller, the plurality of memory access request queues in parallel based on the plurality of request addresses.

14. The memory device of one of claim 12, wherein the memory device includes one or more processors, the one or more programs further comprising instructions for:
allocating a first subset of the one or more processors to the memory controller; and
allocating a second subset of the one or more processors to the data processor, wherein the second subset is distinct from the first subset.

15. The memory device of claim 12, wherein the memory device includes one or more processors, the one or more programs further comprising instructions for:

allocating a first time slot of the one or more processors to the memory controller; and allocating a second time slot of the one or more processors to the data processor, wherein the second time slot is distinct from the first time slot.

16. The memory device of claim 12, wherein the non-volatile memory includes one or more NAND flash chips, and the memory controller is configured to access and manage data stored in the one or more NAND flash chips, and the data processor is configured to process the data stored in the one or more NAND flash chips.

17. A non-transitory computer-readable storage medium storing one or more programs, the one or more programs comprising instructions which, when executed by one or more processors of a memory device, cause the one or more processors to perform:

reserving a register in a buffer for storing memory access information associated with a data processor, wherein the one or more processors are configured to provide a memory controller and the data processor, and the memory device further includes a non-volatile memory and the buffer;

obtaining an operating system (OS) image by the data processor;

executing the OS image by the data processor, including:

loading a guest OS based on the OS image; and aborting installation of an external driver for data communication with the memory controller or a host device coupled to the memory device;

obtaining a notification of a data write request issued by the data processor; and in response to the notification, at the memory controller:

extracting, from the register, a write request location where the data write request is stored;

extracting, based on the write request location, from a first request queue stored in the buffer, the data write request including payload data; and writing the payload data to the non-volatile memory.

18. The non-transitory computer-readable storage medium of claim 17, wherein the notification is a first notification, and the one or more programs further comprises instructions for:

obtaining a second notification of a data read request issued by the data processor; and in response to the second notification, by the memory controller:

extracting, from the reserved register in the buffer, a read request location where the data read request is stored, the data read request including a logical address of target data;

based on the read request location, extracting, from a second request queue stored in the buffer, the data read request including the logical address;

extracting the target data from the non-volatile memory based on the logical address; and providing the target data to the data processor by way of the buffer.

19. The non-transitory computer-readable storage medium of claim 17, wherein the one or more programs further comprise instructions for, at the memory controller, modifying the payload data to generate first data and storing the first data in the non-volatile memory.

20. The non-transitory computer-readable storage medium of claim 17, wherein the one or more programs further comprise instructions for:

running the guest OS by the data processor, wherein the guest OS includes an embedded virtualized network card input/output (VirtIO) driver, and the payload data are generated based on a VirtIO data protocol by the VirtIO driver.

* * * * *